United States Patent
Büttner et al.

(10) Patent No.: US 10,153,670 B2
(45) Date of Patent: Dec. 11, 2018

(54) RELUCTANCE ROTOR HAVING AN ADDITIONAL INHERENT MAGNETIZATION

(71) Applicant: SIEMENS AKTIENGESELLSCHAFT, München (DE)

(72) Inventors: Klaus Büttner, Hollstadt (DE); Marco Cerny, Nüdlingen (DE); Robert Greiner, Baiersdorf (DE); Manfred Ochsenkühn, Berg (DE); Matthias Warmuth, Windshausen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/744,591

(22) PCT Filed: Jun. 7, 2016

(86) PCT No.: PCT/EP2016/062836
§ 371 (c)(1),
(2) Date: Jan. 12, 2018

(87) PCT Pub. No.: WO2017/012766
PCT Pub. Date: Jan. 26, 2017

(65) Prior Publication Data
US 2018/0205273 A1     Jul. 19, 2018

(30) Foreign Application Priority Data
Jul. 17, 2015   (EP) .................................. 15177281

(51) Int. Cl.
*H02K 1/24*    (2006.01)
*H02K 15/03*   (2006.01)
(Continued)

(52) U.S. Cl.
CPC ............. *H02K 1/246* (2013.01); *H02K 1/276* (2013.01); *H02K 15/03* (2013.01); *H02K 1/2766* (2013.01); *H02K 15/12* (2013.01)

(58) Field of Classification Search
CPC ...... H02K 15/00; H02K 15/02; H02K 15/022; H02K 15/028; H02K 1/28; H02K 1/22;
(Continued)

(56) References Cited

U.S. PATENT DOCUMENTS 2,975,310 A * 3/1961 Armstrong ............. H02K 19/14
                                                310/163
5,818,140 A * 10/1998 Vagati .................... H02K 1/246
                                                310/185
(Continued)

FOREIGN PATENT DOCUMENTS

DE       42 17 288 A1    11/1992
EP        1 282 215 A1    2/2003
(Continued)

OTHER PUBLICATIONS

PCT International Search Report dated Jul. 9, 2016 corresponding to PCT International Application No. PCT/EP2016/062836 filed Jul. 6, 2016.

*Primary Examiner* — Tran Nguyen
(74) *Attorney, Agent, or Firm* — Henry M. Feieresen LLC (57) ABSTRACT

The invention relates to a rotor (10) for a reluctance machine (E), wherein the rotor (10) has a laminate stack (14) with layers (16), each of the layers having a plurality of flux-conducting portions (24) which are formed in each case by a magnetically conductive rotor lamination (18) and extend between two adjacent d-axes and transversely to a respective q-axis (30), wherein the flux-conducting portions (24) are separated from each other by in each case a flux barrier (22) which is filled with a casting compound. The aim of the invention is to additionally provide a permanent magnetic
(Continued)

excitation in the rotor (10) without degrading the reluctance of the rotor. To this end, the invention provides that the casting compound comprises permanently magnetic particles (36) in one or more or each of the flux barriers (22).

21 Claims, 4 Drawing Sheets

(51) Int. Cl.
*H02K 1/27* (2006.01)
*H02K 15/12* (2006.01)

(58) Field of Classification Search
CPC .......... H02K 1/24; H02K 1/246; H02K 17/16; H02K 17/165; H02K 19/14
See application file for complete search history.

(56) References Cited

U.S. PATENT DOCUMENTS

| | | | |
|---|---|---|---|
| 5,893,205 A * | 4/1999 | McClelland | H02K 1/246 29/598 |
| 5,990,588 A * | 11/1999 | Kliman | H02K 3/493 310/86 |
| 6,509,667 B1 * | 1/2003 | El-Antably | H02K 15/02 310/156.21 |
| 8,836,193 B2 | 9/2014 | Büttner et al. | |
| 8,963,394 B2 | 2/2015 | Büttner et al. | |
| 9,154,017 B2 | 10/2015 | Büttner et al. | |
| 9,252,642 B2 | 2/2016 | Büttner et al. | |
| 9,257,883 B2 | 2/2016 | Büttner et al. | |
| 9,281,728 B2 | 3/2016 | Büttner et al. | |
| 9,287,754 B2 | 3/2016 | Büttner et al. | |
| 9,515,536 B2 | 12/2016 | Büttner et al. | |
| 9,768,666 B2 | 9/2017 | Büttner et al. | |
| 2003/0192169 A1 * | 10/2003 | Reiter, Jr. | B22F 7/064 29/607 |
| 2007/0151632 A1 | 7/2007 | Komuro et al. | |
| 2012/0133236 A1 | 5/2012 | Büttner et al. | |
| 2013/0187512 A1 | 7/2013 | Büttner et al. | |
| 2015/0042185 A1 | 2/2015 | Büttner et al. | |
| 2015/0207378 A1 | 7/2015 | Büttner et al. | |
| 2015/0214810 A1 | 7/2015 | Büttner et al. | |
| 2015/0349616 A1 | 12/2015 | Büttner et al. | |
| 2015/0372546 A1 | 12/2015 | Büttner et al. | |
| 2016/0056673 A1 | 2/2016 | Büttner et al. | |
| 2016/0056674 A1 | 2/2016 | Büttner et al. | |
| 2017/0012481 A1 | 1/2017 | Büttner et al. | |
| 2018/0205273 A1 * | 7/2018 | Buttner | H02K 1/246 |

FOREIGN PATENT DOCUMENTS

| | | |
|---|---|---|
| EP | 2 744 076 A1 | 6/2014 |
| JP | 2000-068141 A | 3/2000 |
| JP | 2002-095227 A | 3/2002 |
| WO | WO 2009/063350 A2 | 5/2009 |
| WO | WO 2011/018119 A1 | 2/2011 |

* cited by examiner

RELUCTANCE ROTOR HAVING AN ADDITIONAL INHERENT MAGNETIZATION

CROSS-REFERENCES TO RELATED APPLICATIONS

This application is the U.S. National Stage of International Application No. PCT/EP2016/062836, filed Jun. 7, 2016, which designated the United States and has been published as International Publication No. WO 2017/012766 and which claims the priority of European Patent Application, Serial No. 15177281.1, filed Jul. 17, 2015, pursuant to 35 U.S.C. 119(a)-(d).

BACKGROUND OF THE INVENTION

The invention relates to a rotor for a reluctance machine, to an electrical machine having such a rotor and also to a method for manufacturing the said rotor. The rotor has a laminated core with a number of rotor core plate layers insulated electrically from one another. Each rotor core plate can have strip-shaped flux-conducting portions for conducting the magnetic flux between d-axes of the rotor. The flux-conducting portions extend in their longitudinal extent at an angle or transverse to a respective q-axis of the rotor and are separated from one another by flux barriers.

Such a rotor for a reluctance motor is known from U.S. Pat. No. 5,818,140 A. This document describes a rotor, of which the laminated core consists of rotor core plates having punched-out sections. This rotor is also referred to here as a Vagati rotor. Air is located between the individual flux-conducting sections in the flux barriers created by the punched-out sections, which acts as a magnetic flux barrier. The punched-out sections lead to a weakening of the mechanical stability of the laminated core however, so that the described rotor is not suitable for high speeds, in particular is not suitable for speeds of greater that 3,000 rpm. For this reason rotors of the type described are not suitable where a high speed is required.

A Vagati rotor is known from JP 2002 095227 A, in which the flux barriers are encapsulated with a casting compound made of artificial resin. The radially adjacent flux-conducting portions in the invention have trapezoidal-shaped cutouts, into which the artificial resin likewise flows during casting. Through this the flux-conducting portions are then connected via a dovetail connection with the hardened artificial resin. At high speeds a tensile force caused by gravitational forces is redirected in this way from the outer circumference of the rotor via the artificial resin inwards towards the shaft. The disadvantage here is that the trapezoidal-shaped cutouts in the flux-conducting portions adversely affect the efficiency of the motor, since the magnetic flux is impeded. A tensile force is also applied to the artificial resin by the arrangement, which can lead to a break or a crack in the artificial resin.

The continued use of permanent magnets in the rotor is known as a construction principle of a reluctance rotor, in order to obtain a hybrid rotor type comprising a reluctance and synchronous motor. $M=3/2\ p(p*Iq+(Ld-Iq)*Id*Iq)$ is produced as the mechanical torque M created by the rotor, wherein p specifies the number of pole pairs, P specifies the additional field-linked direct axis flux created by the permanent magnets, $Iq$ specifies the q component of the coil current of the stator, $Id$ specifies the d component of the coil current of the stator, $Lq$ specifies the q component of the rotor inductance and $Ld$ specifies the d component of the rotor inductance.

The arranging of permanent magnets in a reluctance rotor has a number of disadvantages. The permanent magnets are generally manufactured as cubes or blocks, which are then inserted into the laminated core of the reluctance rotor. To this end the flux barriers in which the permanent magnets are to be arranged must have a shape with corners to enable the permanent magnets to be accommodated and retained. In that the air barriers are adapted to the shape of the permanent magnets with the lowest possible variance in the shape of the permanent magnets, they are no longer optimally adapted to the field profile of the magnetic flux, as is needed to realize a Vagati rotor. Furthermore the permanent magnets are not able to be arranged without gaps in the curved flux barriers, so that there are gaps, which are filled with air, present between the permanent magnets. Furthermore the permanent magnets are not able to be arranged without gaps in an angled laminated core along the axially curved passages or tunnels arising from this arrangement, since, for inserting the mostly square permanent magnets the dimensions of said magnets, depending on the helix angle, must be smaller than the flux barriers. This leads to a loss of efficiency.

A reluctance rotor, in the flux barriers of which a permanently magnetic material is arranged, is described in document WO 2009/063350 A2. The permanently magnetic material can be arranged in a plastic matrix and the flux barriers can have been filled with it by an injection-molding process. By means of the material an end disk can also be molded in each case onto axial end surfaces of the rotor, in order to stabilize the rotor. By shaping the plastic matrix an imbalance of the rotor can be compensated for.

SUMMARY OF THE INVENTION

The underlying object of the invention is to embody a reluctance rotor with additional inherent magnetization in an efficient manner.

The object is achieved by the subject matter of the independent claims. Advantageous developments of the invention are given by the features of the dependent claims.

A rotor for a reluctance machine is provided by the invention. In a manner known per se, the rotor has a laminated core with a number of laminated core plates or layers for short. Each of the layers, in the way described at the outset, has flux-conductance portions, which are each formed by a magnetically conducting rotor plate and each extend between two adjacent d-axes and at an angle or transverse to a respective q-axis of the rotor. Each exit point from the rotor of one of the d-axes of the rotor represents a pole of the rotor for the reluctance machine. The course of the extent described is related in this case to a cross-section of the rotor formed at right angles to the axis of rotation. The flux-conducting portions are separated from one another in each case by a flux barrier. In other words a flux barrier exists between adjacent flux-conducting portions in each case. This means that the rotor plates are formed from magnetically conductive material, in particular soft magnetic material. By contrast the flux barriers do not have any soft magnetic material. In the inventive rotor the flux barriers are cast with a casting compound.

In order now to provide the rotor with an inherent magnetization, the casting compound is embodied in one or more or each of the flux barriers such that it has grains or particles that are permanently magnetic. In other words the casting compound has a powder or a granulate made of grains or particles, of which each is permanently magnetic, meaning that it creates its own magnetic field in each case. A particle is to be understood in conjunction with the invention in particular as a body or object that has a greatest dimension of 5 centimeters, in particular 1 centimeter. In that the particles are arranged as a casting compound or in a casting compound in the flux barriers, the casting compound has the same shape as the flux barriers, in other words the flux barriers are preferably filled completely with the casting compound.

The invention produces the advantage that the permanently magnetic area in the rotor is adapted in its shape to the shape of the flux barriers. This enables the flux barriers and thereby also the flux-conducting portions to be adapted to a desired course of the magnetic flux, meaning that the rotor will be embodied in the optimum manner in accordance with the principle of Vagati. The additional inherent magnetization of the rotor can be introduced by the particles in the casting compound, without a shape of the magnetically conductive rotor plates having to be adapted or changed in order to do this. Thus one and the same plate section or rotor plates can be used both for a pure reluctance rotor, i.e. a Vagati rotor, and also for an inventive rotor, in which, in addition to the reluctance rotor, a permanent excitation and permanent magnetization is also provided by means of the casting compound.

In accordance with the invention, an end disk formed in each case from a casting compound is cast onto the laminated core at opposite axial core ends of the laminated core. In other words the layers of the laminated core are enclosed or arranged in the axial direction between two end disks. The end disks in this case are formed by means of the casting compound, whereby the end disks can be produced in the same production step as the filling of the flux barriers by means of the casting compound.

To this end there is provision for the casting compound to form a one-piece body in the flux barriers and the end disks, through which the layers of the laminated core have a force applied to them. The force acts in the axial direction towards the middle of the rotor. In other words the layers of the laminated core are pressed together by the two end disks. In other words the laminated core is tensioned by the body made of casting compound. In an advantageous manner this damps out inherent vibrations of the rotor during a rotation of said rotor.

The invention also comprises optional further developments of the rotor, through which additional advantages are produced.

In accordance with a further development, in one or more or in each of the flux barriers, a respective magnetic field of the particles is aligned in a longitudinal extent direction of the respective flux barrier or at an angle to the longitudinal extent direction of the respective flux barrier. The longitudinal extent direction can be defined for example as a central axis of the flux barrier, which preferably extends in the shape of an arc from a d-axis to the adjacent d-axis. The said angle is in particular less than 45°. The advantage of the further development is that the permanently magnetic pole of the rotor formed by the particles and the poles formed at the d-axes for the reluctance machine are arranged in relation to each other such that both the reluctance-based torque and also the synchronous machine-based torque can be created with the same magnetic coils of the stator.

BRIEF DESCRIPTION OF THE DRAWING

In accordance with a further development, in one or more or in each of the flux barriers, the particles are deposited as a dry sediment in the flux barrier. In other words the particles are poured or pressed into the flux barriers as a suspension, for example as slurry, and subsequently the casting compound has been hardened so that only the particles remain. The advantage produced by this is that the casting compound has an especially high proportion of particles since no further fillers are arranged in the flux barrier.

In accordance with a further development, in one or more or in each of the flux barriers, the particles are arranged in a solid plastic. In other words the particles are arranged in a carrier matrix or plastic matrix. A proportion by volume of the particles in the casting compound can lie in a range of between 10 percent and 80 percent here. The plastic increases the mechanical stability of the rotor. A duroplastic or a thermoplastic can be provided as the plastic for example. In addition there can be provision that, in the casting compound in one or more or in each of the flux barriers, the casting compound has a filler that has a greater tensile strength than the plastic. This increases the fracture strength of the plastic, which is especially advantageous during the transmission of centrifugal forces, since a plastic, for example an artificial resin, can be brittle and thereby subject to fractures if tensile forces are transmitted. The filler can be formed by fibers for example, in particular by glass fibers.

In accordance with a further development at least one of the end disks, preferably both end disks, is or are embodied rotationally asymmetrical and the respective rotational asymmetry of the end disks compensates for an imbalance of the laminated core present in relation to the axis of rotation. In other words the end disks can have raised contours for example or contours can be inserted into the end disks, which simplifies the balance compensation or balancing of the rotor. The imbalance is compensated for by the end disks at least partly, preferably completely.

A further development of the invention makes provision for the particles to be provided as a permanent magnetic powder in at least one of the flux barriers, or in both flux barriers. A hard ferrite powder is especially cost-effective here. A rare earth magnetic powder can also be provided, through which an especially high field density of the magnetic field created by the particles is achieved. A mixture of two different permanent magnetic powders can also be provided, whereby properties of the respective magnetic powder will be combined.

In accordance with a further development an average particle diameter D50 lies in a range of between 10 micrometers and 1 millimeter. The particle diameter D50 describes the grain size of the particles as a central value of the 50% quantile of the statistical distribution of the particle diameter of grain sizes. A particle diameter D50 in a range larger than 200 micrometers has the advantage in this case that, within each particle, the alignment of the magnetic field is especially stable and/or homogeneous, since fewer grain boundaries are present than a particle diameter D50 in a range of less than 200 micrometers. This range has the advantage on the other hand that the particles are arranged especially densely and/or filling the space in the flux barriers.

A further development makes provision for the particle diameters of the particles to have a statistical distribution that is monomodal in one or more or in each of the flux barriers. In particular the particle diameter D50 represents a single maximum point of a statistical distribution of the particle diameters. In order to combine the described advantages of large particles and small particles, a further development makes provision for the statistical distribution to be bimodal or multimodal. With bimodal or multimodal particle sizes the effect is obtained that the fill level increases and thus the magnetic properties are greater by comparison with a monomodal distribution. The statistical distribution described is also referred to as particle size distribution.

A further development of the invention makes provision for one or each of the flux barriers to be embodied in the cross section of the rotor as a round arc extending between two adjacent d-axes in each case. In other words the long axis of these flux barriers already described is embodied as an arc, which is embodied curved towards the axis of rotation of the rotor and connects a d-axis with the adjacent d-axis in the circumferential direction at least by way of an extension. The flux barriers thus have an arc-shaped form. Preferably they also have a round, i.e. corner-free contour. This produces the advantage that the flux guidance for the magnetic flux of the stator is especially efficient for a reluctance drive. This enables the shape of the laminated core, which is used for manufacturing the rotor in accordance with the invention also to be used for manufacturing a reluctance rotor without inherent magnetization. Thus no special sheet metal blank is needed for manufacturing the rotor plates for pure reluctance rotors on the one hand and the inventive rotor, meaning that the same punching tool can be used for providing the rotor plates. This makes the inventive rotor especially cost-effective in its manufacture since it can be constructed from or based on laminated cores of a conventional reluctance rotor.

An electrical machine that can be operated as a reluctance motor and/or as a reluctance generator also belongs to the invention. The electrical machine has a stator and a rotor rotatably supported in the stator, which is an embodiment of the inventive rotor. The electrical machine can thus can be operated in accordance with the reluctance principle and also in accordance with the principle of the synchronous machine combined or simultaneously. This makes the efficiency of the electrical machine greater than that of a pure reluctance machine.

The inventive rotor is manufactured in particular by a form of embodiment of the inventive method.

The inventive method makes provision, for forming each layer of the laminated core, for providing a magnetically conductive rotor plate layer or a plate for short, which has the flux-conducting portions of the layer and in which cutouts are provided as the flux barriers, which can be created by punching-out for example. The plates are stacked or threaded onto one another in an axial direction to form the laminated core. Here the flux barriers are in particularly arranged axially flush, so that in the laminated core the flux barriers of the individual layers form an axial tunnel, passage or shaft running axially obliquely or at an acute angle with the respective corresponding flux barriers of the other layers. After the threading-on of the laminated core the flux barriers are filled with the casting compound as a free-flowing or flowing suspension. The particles of the casting compound have a magnetic field applied to them while the casting compound is soft. This results in the magnetic fields of the particles aligning themselves along the field characteristics of the magnetic field. The casting compound is then hardened. The barriers can be filled with the casting compound by injection molding for example. In conjunction with the filling of a slurry as casting compound, the latter can be administered by injection pressing. Subsequently the slurry can be dried, in that the liquid contained therein, for example water, is pressed out and/or dried by heating the slurry.

The method makes provision for the casting compound to have fibers, and at the opposite axial core ends of the laminated core, for an end disk formed from the casting compound in each case to be cast onto the laminated core, so that the casting compound forms a one-piece body in the flux barriers and the end disks, through which an axial force is applied to the layers of the laminated core.

In accordance with the described form of embodiment, the particles have the magnetic field applied to them during the filling with casting compound. This produces the advantage that the particles are in motion. This enables even large particles and/or asymmetrical and/or longitudinal-shaped particles to be aligned with such as magnetic field, which does not have to be strong enough to also be able to turn these particles even when they at a standstill.

In accordance with one form of embodiment of the invention, in addition or as an alternative, the particles have the magnetic field applied to them after the filling process. This produces the advantage that a clump formation of the casting compound by magnetic adhesion of the particles during filling can be reduced or avoided. In particular the magnetic field is aligned to the particles exclusively after filling. There can however be a combination of the two method steps, so that the particles have the magnetic field applied to them during and after the filling. Different magnetic field strengths can be provided here, in order to prevent a clumping of particles during the filling process and yet still align these particles. Here the magnetic field is preferably weaker during the filling process than it is after the filling process. By means of the magnetic field that is applied after the filling process the particles are magnetized in accordance with one form of embodiment, i.e. the flux barriers are initially filled with particles as unmagnetized particles and these are then permanently magnetized after the filling process.

Each plate that forms one of the layers can have the individual flux-conducting portions as contiguous subareas. A further development makes provision for the separation of the flux portions after the threading-on of the plates. Here, after the plates have been threaded on, an outer ring of each plate is removed by a cutting method and through this each of the plates is divided up or separated into a number of flux-conducting portions or magnetically conductive rotor plates separated from one another.

An exemplary embodiment of the invention is described below. In the figures.

DETAILED DESCRIPTION OF PREFERRED EMBODIMENTS

The exemplary embodiment explained below involves a preferred form of embodiment of the invention. In the exemplary embodiment the described components of the form of embodiment each represent individual features of the invention to be considered independently of one another, which also develop the invention independently of one another and thus are also to be viewed, on their own or in a combination other than that shown, as a component of the invention. Furthermore the described form of embodiment is also able to be supplemented by further of the already described features of the invention.

In the figures elements having the same function are labeled with the same reference characters in each case.

Figure 1:
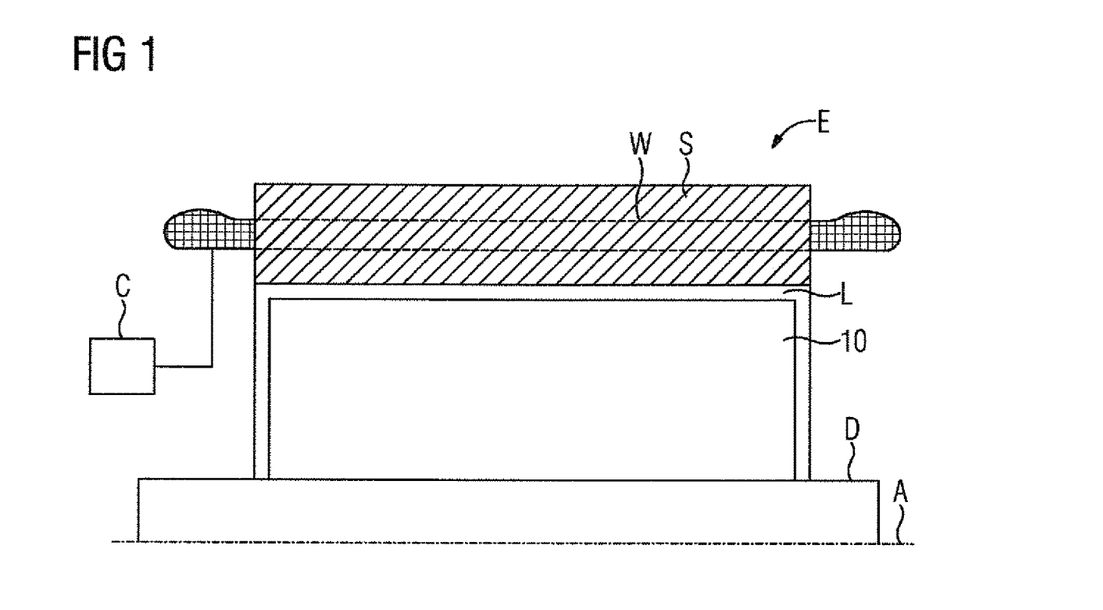
FIG. 1 shows a schematic diagram of a form of embodiment of the inventive electrical machine.

FIG. 1 shows a longitudinal section of an electrical machine E, which involves a reluctance motor for example. In FIG. 1 an axis of rotation A also represents an axis of symmetry of the diagram. The electrical machine E comprises a stator S, in which windings W of electrical coils are arranged, wherein only one of the windings is shown in FIG. 1. The windings W can be formed from electrically conductive electrical elements, e.g. wires or rods. The windings W are powered alternately by an alternating current source C, whereby in the interior of the stator S a magnetic alternating field arises in an air gap L of the electrical machine. The alternating current source C can be an inverter or a fixed-frequency electrical power supply network for example.

A rotor 10, which is fixed to a shaft D in a torsion-proof manner, is located inside the stator S. The shaft D is supported rotatably around the axis of rotation A in the stator S.

Figure 2:
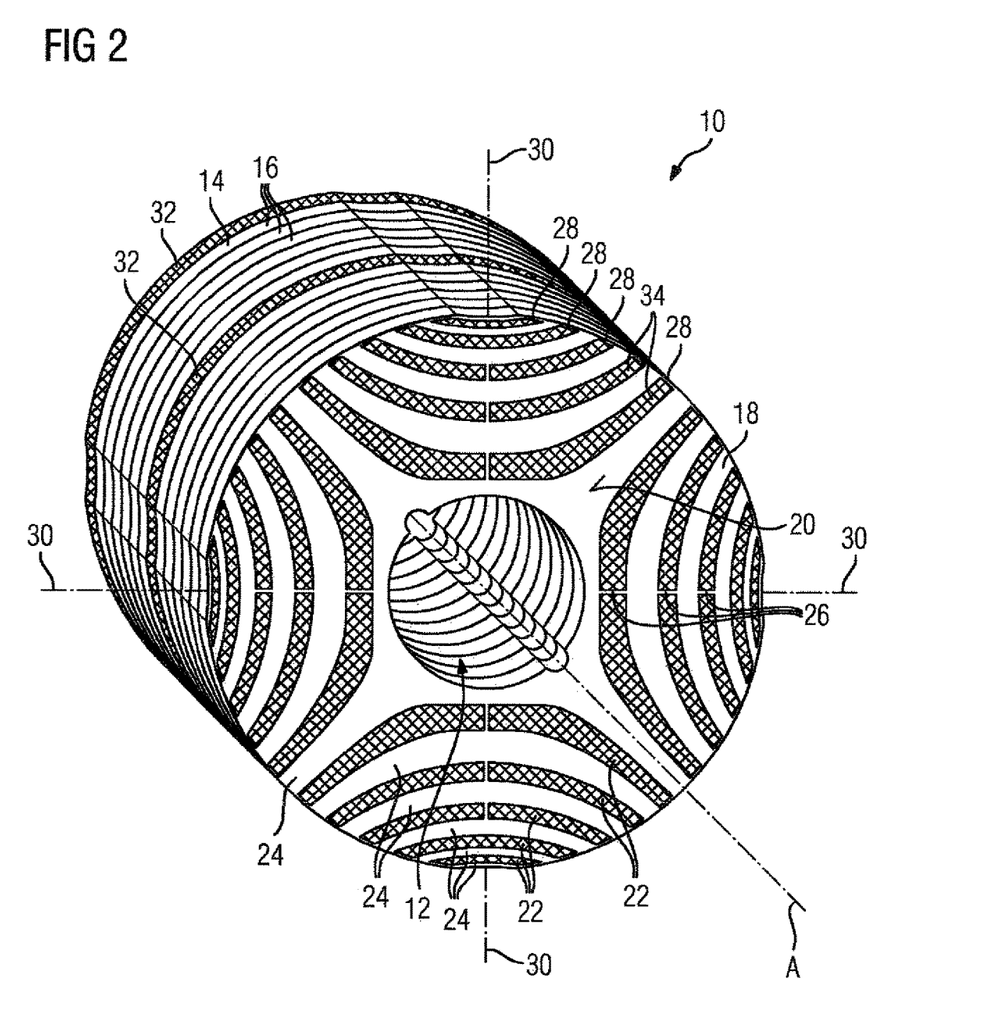
FIG. 2 shows a schematic diagram of a perspective view of a rotor of the electrical machine from FIG. 1.

The rotor 10 is a form of embodiment of the inventive rotor. In FIG. 2 the rotor 10 is shown on its own.

The shaft D (no longer shown in FIG. 2) is pushed through a through-opening 12 of the rotor 10. A diameter of the rotor 10 in the radial direction in relation to the axis of rotation A can amount to more than 20 cm. A length of the rotor 10 in the axial direction can amount to more than 30 cm.

The rotor 10 has a laminated core 14, which is formed from a number of layers 16, as its magnetically active part. For the sake of clarity only a few of the magnetic layers 16 are labeled with a reference character in FIG. 2. Between the layers is located an electrically insulating layer known in a manner known per se in each case, in order to block eddy currents in the laminated core 14. Each layer 16, in the example shown in FIG. 2, is formed by a soft-magnetic rotor plate 18 in each case. Another name for a rotor plate is also electro plate or transformer plate.

In FIG. 2 only the rotor plate 18, which is located on an end-face side 20 in the axial direction along the axis A at a front end of the laminated core 14, is labeled with a reference character. The rotor plate 18 (and correspondingly also the remaining rotor plates of the remaining layers 16) has cutouts 22, which form barriers for a magnetic flux, i.e. flux barriers. The cutouts 22 can be formed by punching-out the corresponding shapes from the rotor plate 18.

Thus only flux-conducting portions 24 and optional webs 26 for mechanical connection of the flux-conducting portions 24 as well as optionally an outer ring 28 for mechanical connection of the flux-conducting portions 24 of the rotor plate are present. The rotor plates of the layers can all have the same form. By means of the flux-conducting portions 24 a magnetic flux, which is created by the electrical coils W or the stator S, will be conducted or guided in the rotor at an angle or transverse to q-axes 30 of the rotor 10 in a magnetic preferred direction between two d-axes in each case.

The rotor plates 18 can be arranged flush in the laminated core 14 axially behind one another in a way in which the cutouts 22 and correspondingly also the flux-conducting portions 24 are flush with each other axially. The cutouts 22 of all rotor plates 18 arranged behind one another all together form shafts or spaces in the laminated core 14. A casting compound is located in the shafts. The casting compound in particular has a lower magnetic conductivity than the material of the flux-conducting portions.

Figure 3:
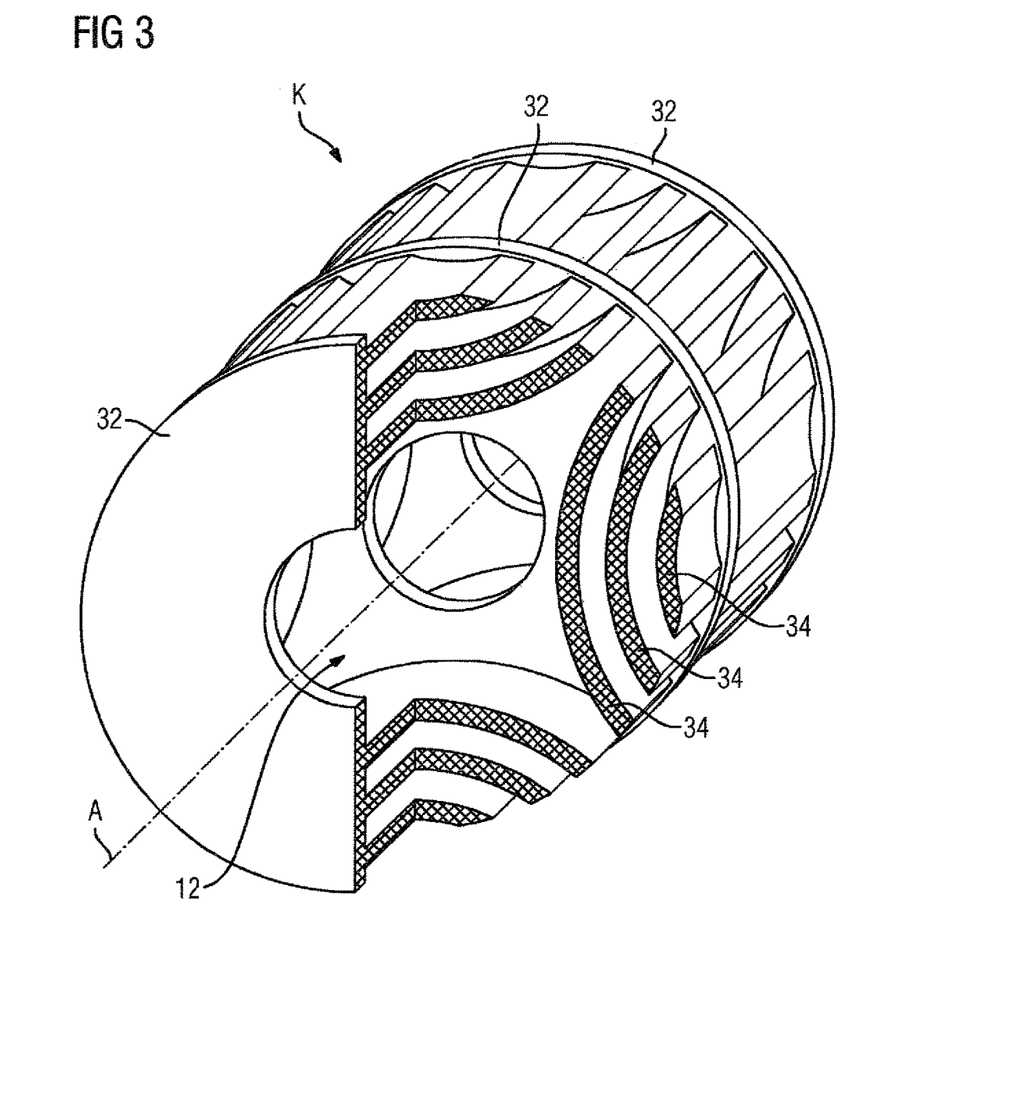
FIG. 3 shows a schematic diagram of a perspective view of a part section of a body formed by the casting compound in the rotor of FIG. 2.

In FIG. 3 it is shown that the casting compound in the flux barriers together with disks 32 made of the casting compound forms a body K, in which the flux-conducting portions 24 (not shown in FIG. 3) are embedded or integrated or arranged. The body K can have been manufactured with the casting compound by filling the flux barriers, i.e. the shafts formed by the cutouts 22 in the laminated core 14 with the casting compound. Through this process rods 34 made of the material of the casting compound are embodied in the cutouts 22. In order to connect the rods 34 mechanically, the rods 34 are connected by radial completely cast subareas in the form of the disks 32. "Completely cast" here means that the through-opening 12 for the shaft is naturally also provided in the disks 32.

Two of the disks 32 are provided at the two end-face sides, i.e. the end-face side 20 and the axially opposite side of the laminated core 14, as end disks. In this case the front disk 32, which is located on the end-face side 20, is not shown in FIG. 2, in order to be able to present the structure of the rotor plate 18. There can also be provision that, for further mechanical stabilization, in addition to the disks 32 lying axially on the laminated care ends, one or more intermediate disks made of the casting compound are provided in the laminated core 14.

The casting compound can have been introduced by means of an injection molding or die casting process or by injection pressing after the threading-on, i.e. the arrangement of the rotor plates 18 on one another, into the cutouts 22 and into the area of the disks 32. In order to define the thickness of the disks 32 and their position, adjacent rotor plates 18 can be held apart from one another during the threading-on process by distance pieces, for example rings or blocks, so that during casting the cylindrical intermediate disks made of casting compound are produced.

During casting the two disks 32 on the ends of the laminated core 14 can also be formed, whereby a mechanically rigid connection of the laminated core 14 is produced. The laminated core 14 can thus be used as a single assembly. An expensive joining process of the individual plates on the shaft D, together with the end disks 32 for tensioning, can be avoided, whereby manufacturing costs are saved. The casting also prevents radial and axial vibrations of the individual rotor plates 14, since a fixed structure is involved.

The speed suitability can be increased by material with high tensile strength and materials with suitable fillers, by a filler, especially fibers, in particular glass fibers, being provided in the casting compound.

Figure 4:
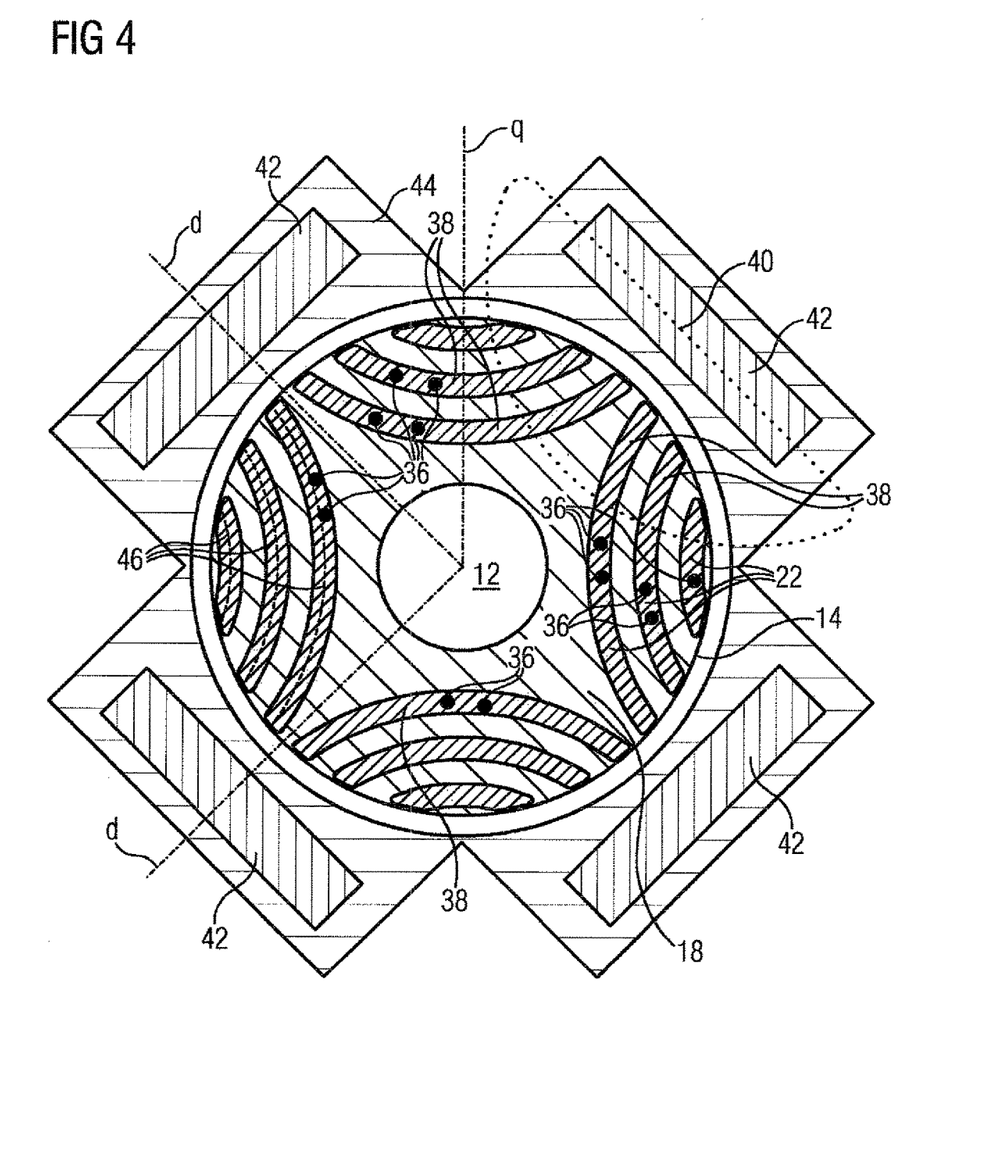
FIG. 4 shows a schematic diagram of a cross-section of a rotor from FIG. 2, wherein here a representation of the respective magnetic field of the particles at an angle to the longitudinal extent directions of the flux barriers is specified.

As is illustrated in FIG. 4, the casting compound has grains or particles 36, of which each represents a permanent magnet. In other words the particles are permanently magnetic. Only a few particles 36 are shown by way of example in FIG. 4, these also being shown greatly enlarged. Each particle 36 can be smaller than a respective diameter of each particle 36, can be smaller than 5 centimeters, especially 1 centimeter, preferably smaller than 1 millimeter. A number of the particles is in particular greater than 1000, in particular greater than 5000.

Through the magnetic body K formed by means of the casting and as a result of the particles 36 a linkage is produced of the reluctance effect formed by the flux-conducting portions 24 and a permanent magnetic excitation corresponding to a synchronous motor.

The particles can be bound to a plastic, meaning that they are embedded or integrated into a plastic 38. At least one flux barrier or cutout 22 between two adjacent d-axes in each case has the permanent magnetic particles 36 here. To this end the particles 36 can be provided as permanent magnetic powder in the casting compound. The casting compound is then able to be used in the flowable state for casting or injection molding or injection pressing the cutouts 22. The powder can have a mono, bi or multimodal particle size and particle distribution. A plastic matrix is formed by the plastic 38, in which the magnetic powder proportions are possible in volumes formed in any way. There can be provision for a volume ratio of between 20 percent and 80 percent, in order hereby to obtain a reconciliation between magnetic excitation by the particles 36 on the one hand and mechanical stability through the plastic 38 on the other hand. At the same time the end disks 32 of the rotor are also cast with this plastic composite, which guarantee and axial tensioning of the rotor core and also stabilize the rotor overall. In order to increase the tensile strength of the body K if needs be, a further filler can be provided in addition, in particular fibers. The plastic 38 can be formed from a duroplastic and/or thermoplastic and be adapted flexibly thereby to the requirement profile of the electrical machine E.

FIG. 4 further shows how the particles 36 can be aligned in relation to their magnetic field. For alignment of the magnetic material there is the possibility, during the injection molding, to impress a magnetic field 40 into the laminated core 14. To this end the laminated core 14 can be arranged in an arrangement consisting of electrical coils 42 and a soft magnetic flux guide 44. Thus the possibility exists of setting up the magnetic field 40 during the injection molding, so that the magnetic particles or particles 36 will be aligned in a plastic melt of the plastic 38 anisotropically in accordance with a course of the cutouts or flux barriers or respectively a course of the flux-conducting portions 24. It is also possible to magnetize the magnetic material, meaning the particles 36, after the casting, by the applied magnetic field 40. In other words the particles will be arranged in unmagnetized form in the cutouts 22 and subsequently magnetized or turned into permanent magnets after the cutouts have been filled with the casting compound. A combination of the two methods for magnetization described also works if the particles 36 are already permanently magnetic before the filling process.

The introduction 36 as casting compound or casting of the particles into the laminated core 14 enables a longitudinal extent direction 46 of the cutouts 22 in the cross-section of the laminated core 14, i.e. of the rotor 10, shown in FIG. 4, to have an course in the shape of an arc and in particular without corners between the d-axes and hereby to be embodied optimized for the reluctance effect. The casting compound adapts itself to the shape of the flux barriers during the process of filling the flux barriers with it.

Overall this thus produces a simple and complete filling of the flux barriers with a magnetic material in the form of particles 36. The particles 36 or magnetic particles are aligned along the required magnetic flux. Technical properties of the body K are able to be set by proportionate use of the material components plastic, magnetic particles and filler or fibers. The attachment and axial tensioning of the rotor plates can be provided by fitting end disks made of the same casting compound. In the manufacturing of the described rotor and such rotors as are not to have any permanent excitation, but are to form pure Vagati rotors, in an advantageous manner only on rotor plate section is necessary for the pure reluctance technology with flux barriers and for the described magnetically supported reluctance technology. This produces a reduction in manufacturing steps and savings in costs.

Overall the example shows how a reluctance rotor with plastic-bound magnetic material can be provided.

What is claimed is:

1. A rotor for a reluctance machine, comprising:
a laminated core having opposite axial core ends and including layers, each of the layers comprising a magnetically conducting rotor plate configured to form plural flux-conducting portions which extend in between two adjacent d-axes and at an angle to a q-axis, said rotor plate including flux barriers to separate the flux-conducting portions from one another, said flux barriers being cast with a casting compound having fibers, with the casting compound of at least one of the flux barriers having particles that are permanently magnetic, said laminated core including end disks respectively arranged at the opposite axial core ends and formed from the casting compound cast onto the laminated core, so that the casting compound in the flux barriers and the end disks form a one-piece body that applies an axial force upon the layers of the laminated core.

2. The rotor of claim 1, wherein the particles in the at least one of the flux barriers are magnetized to generate a magnetic field which is aligned in a longitudinal extent direction of the at least one of the flux barriers or at an angle to the longitudinal extent direction of the at least one of the flux barriers.

3. The rotor of claim 1, wherein the particles in the at least one of the flux barriers are deposited as a dried sediment.

4. The rotor of claim 1, wherein the particles in the at least one of the flux barriers are arranged in a solid plastic.

5. The rotor of claim 1, wherein at least one of the end disks is arranged rotationally asymmetrically to compensate, at least in part, for an imbalance of the laminated core in relation to an axis of rotation.

6. The rotor of claim 1, wherein the particles in the at least one of the flux barriers are provided as a permanent magnetic powder selected from the group consisting of hard ferrite powder and a rare earth magnetic powder.

7. The rotor of claim 1, wherein the particles in the at least one of the flux barriers have an average particle diameter in a range of 10 micrometers to 1 millimeter.

8. The rotor of claim 1, wherein the particles in the at least one of the flux barriers are defined by a particle diameter having a statistical distribution that is monomodal or bimodal or multimodal.

9. The rotor of claim 1, wherein at least one of the flux barriers has a cross section in the form of a round arc extending between two adjacent d-axes.

10. An electrical machine, comprising:
a stator; and
a rotor supported rotatably in the stator and comprising a laminated core having opposite axial core ends and including layers, each of the layers comprising a magnetically conducting rotor plate configured to form plural flux-conducting portions which extend in between two adjacent d-axes and at an angle to a q-axis, said rotor plate including flux barriers to separate the flux-conducting portions from one another, said flux barriers being cast with a casting compound having fibers, with the casting compound of at least one of the flux barriers having particles that are permanently magnetic, said laminated core including end disks respectively arranged at the opposite axial core ends and formed from the casting compound cast onto the laminated core, so that the casting compound in the flux barriers and the end disks form a one-piece body to apply an axial force upon the layers of the laminated core.

11. The electric machine of claim 10, wherein the particles in the at least one of the flux barriers are magnetized to generate a magnetic field which is aligned in a longitudinal extent direction of the at least one of the flux barriers or at an angle to the longitudinal extent direction of the at least one of the flux barriers.

12. The electric machine of claim 10, wherein the particles in the at least one of the flux barriers are deposited as a dried sediment.

13. The electric machine of claim 10, wherein the particles in the at least one of the flux barriers are arranged in a solid plastic.

14. The electric machine of claim 10, wherein at least one of the end disks is arranged rotationally asymmetrically to compensate, at least in part, for an imbalance of the laminated core in relation to an axis of rotation.

15. The electric machine of claim 10, wherein the particles in the at least one of the flux barriers are provided as a permanent magnetic powder selected from the group consisting of hard ferrite powder and a rare earth magnetic powder.

16. The electric machine of claim 10, wherein the particles in the at least one of the flux barriers have an average particle diameter in a range of 10 micrometers to 1 millimeter.

17. The electric machine of claim 10, wherein the particles in the at least one of the flux barriers are defined by a particle diameter having a statistical distribution that is monomodal or bimodal or multimodal.

18. The electric machine of claim 10, wherein at least one of the flux barriers has a cross section in the form of a round arc extending between two adjacent d-axes.

19. A method for manufacturing a rotor, comprising:
    forming a layer for a laminated core by providing flux-conducting portions in a magnetically conductive plate and forming cutouts in the magnetically conductive plate to establish flux barriers;
    arranging a plurality of said layer such as to form the laminated core;
    filling the flux barriers with a casting compound as a flowable suspension which contains fibers;
    applying a magnetic field to particles in the casting compound;
    forming end disks at opposite axial core ends of the laminated core by casting the casting compound onto the laminated core, such that the casting compound in the flux barriers and the end disks form a one-piece body that applies an axial force upon the layers of the laminated core; and
    hardening the casting compound.

20. The method of claim 19, wherein the magnetic filed is applied to the particles, when the flux barriers are filled with the casting compound, while the casting compound is soft.

21. The method of claim 19, wherein the magnetic filed is applied to the particles, after the flux barriers have been filled with the casting compound so that the particles are magnetized thereafter.

* * * * *